Sept. 24, 1968 A. AREGGER 3,403,067

AUTOMATIC REPEATING APPARATUS

Filed Aug. 10, 1965 5 Sheets-Sheet 1

Inventor:
Alois Aregger
By Michael S. Striker
Attorney

Sept. 24, 1968 A. AREGGER 3,403,067

AUTOMATIC REPEATING APPARATUS

Filed Aug. 10, 1965 5 Sheets-Sheet 2

Inventor:
Alois Aregger
By Michael S. Striker
Attorney

Sept. 24, 1968 A. AREGGER 3,403,067

AUTOMATIC REPEATING APPARATUS

Filed Aug. 10, 1965 5 Sheets-Sheet 3

Inventor
Alois Aregger
By Michael S. Striker
Attorney

Inventor:
Alois Aregger
By Michael S. Striker
Attorney

Sept. 24, 1968 A. AREGGER 3,403,067

AUTOMATIC REPEATING APPARATUS

Filed Aug. 10, 1965 5 Sheets-Sheet 5

Inventor
Alois Aregger
By Michael S. Striker
Attorney

United States Patent Office 3,403,067

Patented Sept. 24, 1968

3,403,067

AUTOMATIC REPEATING APPARATUS

Alois Aregger, St. Niklausen, Lucerne, Switzerland, assignor to Nahma AG, Unterageri, Zug, Switzerland Filed Aug. 10, 1965, Ser. No. 479,058
Claims priority, application Switzerland, Aug. 12, 1964, 10,567/64
9 Claims. (Cl. 274—15)

ABSTRACT OF THE DISCLOSURE

A record player is provided with a tone arm carrying a stylus. In a selected position of the tone arm, a switch is actuated to start a motor which raises the tone arm and causes return of the same by gravity to a selected start position so that the same part of the record can be automatically played several times.

The present invention relates to automatic repeating apparatus for record players, and more particularly to automatic apparatus for repeatedly playing a selected section of a record.

Records which contain teaching material, for example, language courses, may contain chapters which the student would like to hear repeatedly without completing the playing of the record, or without starting the record from the beginning. If the stylus of the tone arm is manually set in the record groove and manually removed from the same after a portion of the record has been played, damage is done to the record.

It is frequently desired to listen repeatedly to a particular section of music recorded on a record, and if this is done by manually setting and removing the tone arm with the stylus, the record is damaged.

It is one object of the invention to overcome this disadvantage, and to provide apparatus permitting a repeated playing of a selected section only of a record.

Another object of the invention is to provide automatic apparatus for this purpose accomplishing the removal of the stylus at predetermined points of the groove of the record and placing of the stylus at another predetermined earlier point of the groove.

Another object of the invention is to provide apparatus serving this purpose which is of particularly simple, efficient and compact construction.

Another object of the invention is to provide apparatus for this purpose in which the tone arm after reaching a position at the end of a selected zone of the record, is automatically returned by the force of gravity to a selected starting position.

Another object of the invention is to provide apparatus which will facilitate the transcribing of a text on a record.

With these objects in view, the present invention provides apparatus for automatically repeating the playing of a selected section of the record. One embodiment of the invention comprises a tone arm which is movable between a raised position and a play position engaging the record and being moved in the play position by the spiral record groove inward towards the center of the record along a path; first means, such as a stop, disposed on the path for engaging the tone arm in a start position and being preferably adjustable; second means, such as a sensing switch on the path, engaged by the tone arm in an end position and being preferably adjustable; and means controlled by said sensing switch when the same is actuated by the tone arm to move the same to the raised position, and for effecting a return movement of the tone arm from the raised end position to the start position and play position in which the tone arm is moved by the record groove again to the end position. In this manner, a section of the record, selected by adjusting the position of the stop at the beginning of the section and of the sensing switch at the end of the section, is repeatedly played.

In the preferred embodiment of the invention, a raised slanted guide arm supports the tone arm during a downward sliding movement under the action of gravity from the raised end position to lower start and play positions.

In one embodiment of the invention, the tone arm is mounted on the guide arm for sliding movement during playing of the record section, as well as during the return movement. In another embodiment of the invention, which is advantageously embodied in an adaptor for standard record players, the guide arm is placed under the standard tone arm so that the same is first raised by the end of the guide arm, and then slides downwardly along the slanted guide arm to the start position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
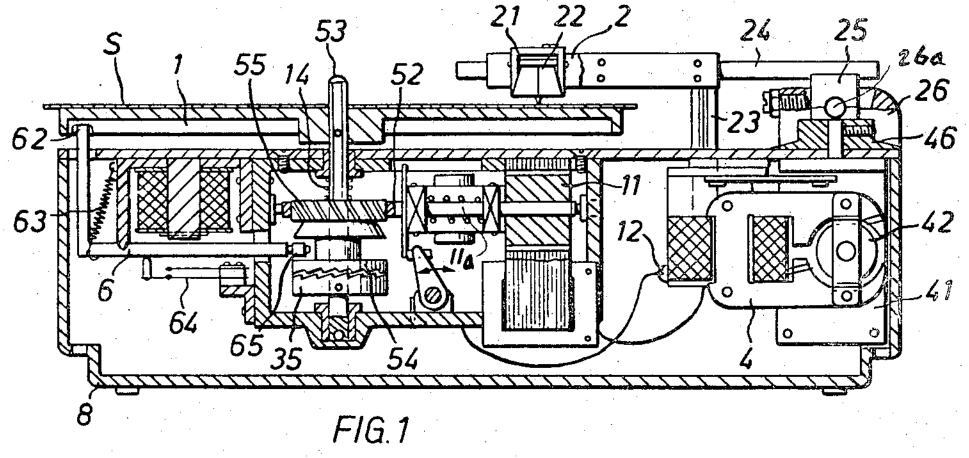
FIG. 1 is a longitudinal section view taken on line I—I in FIG. 3.
Figure 3:
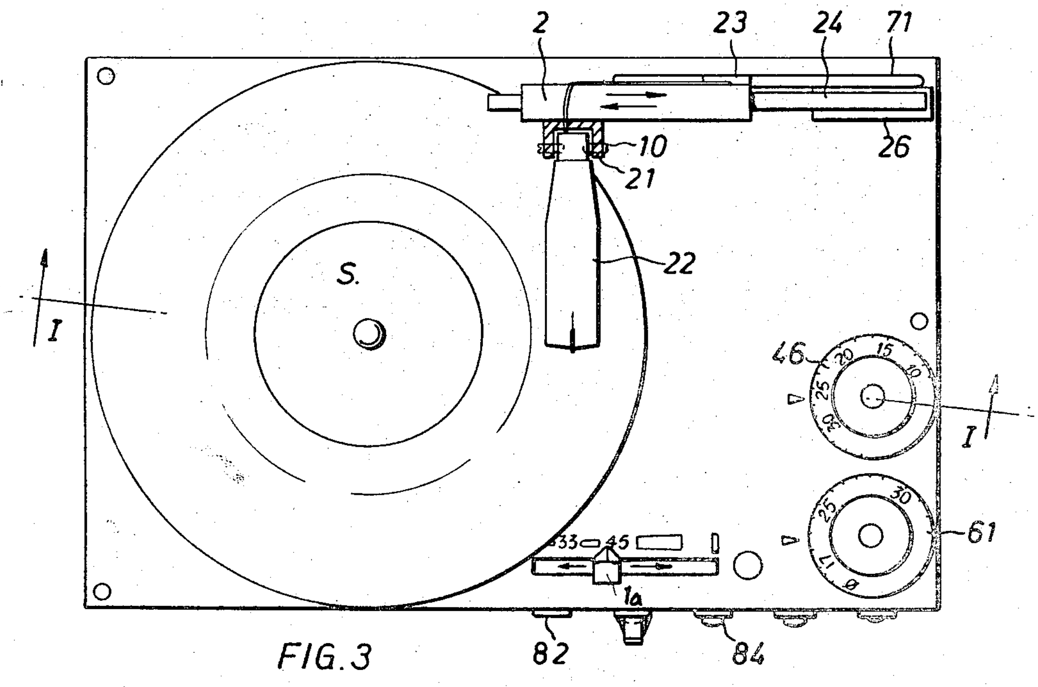
FIG. 3 is a plan view of the embodiment of FIG. 1.
Figure 2:
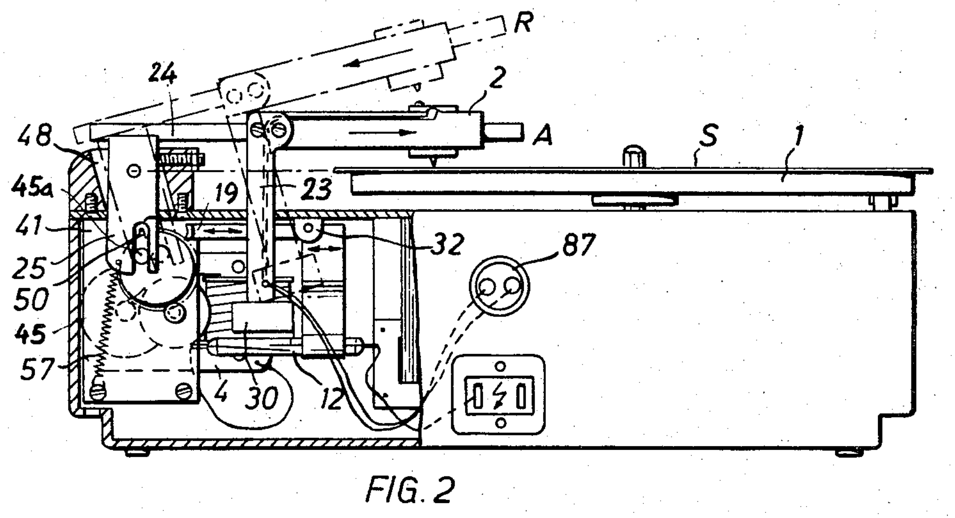
FIG. 2 is an elevation, partially in section of the embodiment of FIG. 1.

Referring now to the drawings, and more particularly to FIGS. 1 to 4, a support 26 is mounted on a casing 8 and has a pivot 26_a_ on which a guide arm 24 is mounted for pivotal movement. As best seen in FIG. 2, guide arm 24 has a downwardly projecting arm 25 formed with a slot 50 in which a crank pin on a gear 45 is located so that upon rotation of gear 45, arm 24 is turned from the position A to the downwardly slanted position R shown in broken lines. A sliding carriage 2 is mounted on guide arm 24 for sliding or rolling movement, and carries a support 21 in which a tone arm 22 including a stylus, is mounted for pivotal movement on a pair of adjustable screws 10, as best seen in FIG. 3. A record S is placed on the central post 53 of the turn table 1, and rotates with members 1 and 53 so that the stylus in the spiral groove of the record is moved along a straight path in radial direction while carriage 2 moves along guide arm 24 from the right to the left as viewed in FIG. 3.

If guide arm 24 is raised from the position A to the slanted position R, carriage 2 is raised at the same time with tone arm 22 so that the stylus is moved out of the record groove. In the raised position R, carriage 2 moves downwards along guide arm 24 until this movement is stopped in a manner which will be described hereinafter in a position in which the tone arm 22 is located farther outward on the record and again in a play position so that a playing movement will again be started.

Carriage 2 has a downwardly depending arm 23 passing through a slot 71 in the top plate of casing 8, as best seen in FIGS. 2 and 3. In the end position of the tone arm and carriage, magnet 30 is located in the region of a magnetic switch 12, and in the start position of tone arm 22 and carriage 2, magnet 30 is located spaced from the same. When magnet 30 actuates the magnetic switch 12, a motor 4 is energized which drives by its shaft 28 a gear train 39, 44, 45 so that crank pin 45*a* on gear 45 causes angular displacement of arm 25 and of guide arm 24 with carriage 2 to the raised position R so that carriage 2 slides down along guide arm 24 together with arm 23 and magnet 30 whereby the magnet is separated from the magnetic switch which deenergizes motor 4 so that the same stops. The weight of tone arm means 24, 2, 23, 22 acts through arm 25 on crank pin 45*a* to turn gear 45 and rotor 42 of motor 4 in opposite direction. This movement is aided by a spring 57 acting on arm 25 so that guide arm 24, carriage 2 and tone arm 22 slowly move to the lower position A. Rotar 42 is also braked before the tone arm means reach the highest position and lowest position, and this is accomplished by a coil spring 28 acting on rotor 42 and on shaft 43 by which the gear train 39, 44, 45 is driven. Due to the slow downward movement of the tone arm, the stylus engages the groove of the record without damaging the same.

Support 26 has a cavity 48 in which arm 25 turns between two extreme positions. However, the magnetic switch 12 disconnects motor 4 before the rising tone arm is mechanically stopped by support 26.

Figure 4:
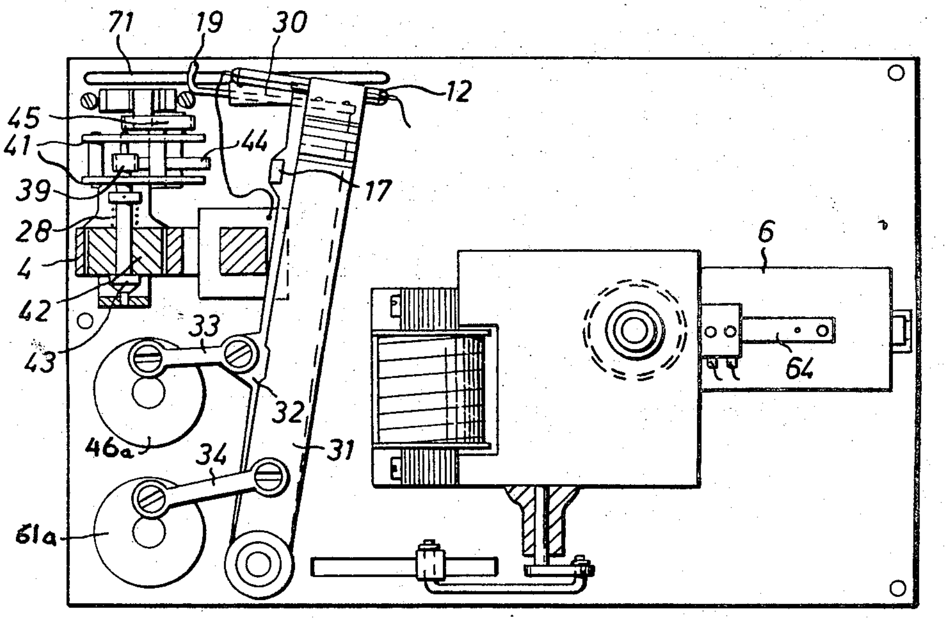
FIG. 4 is a bottom view of the embodiment of FIG. 1 with the bottom plate removed.
Figure 5:
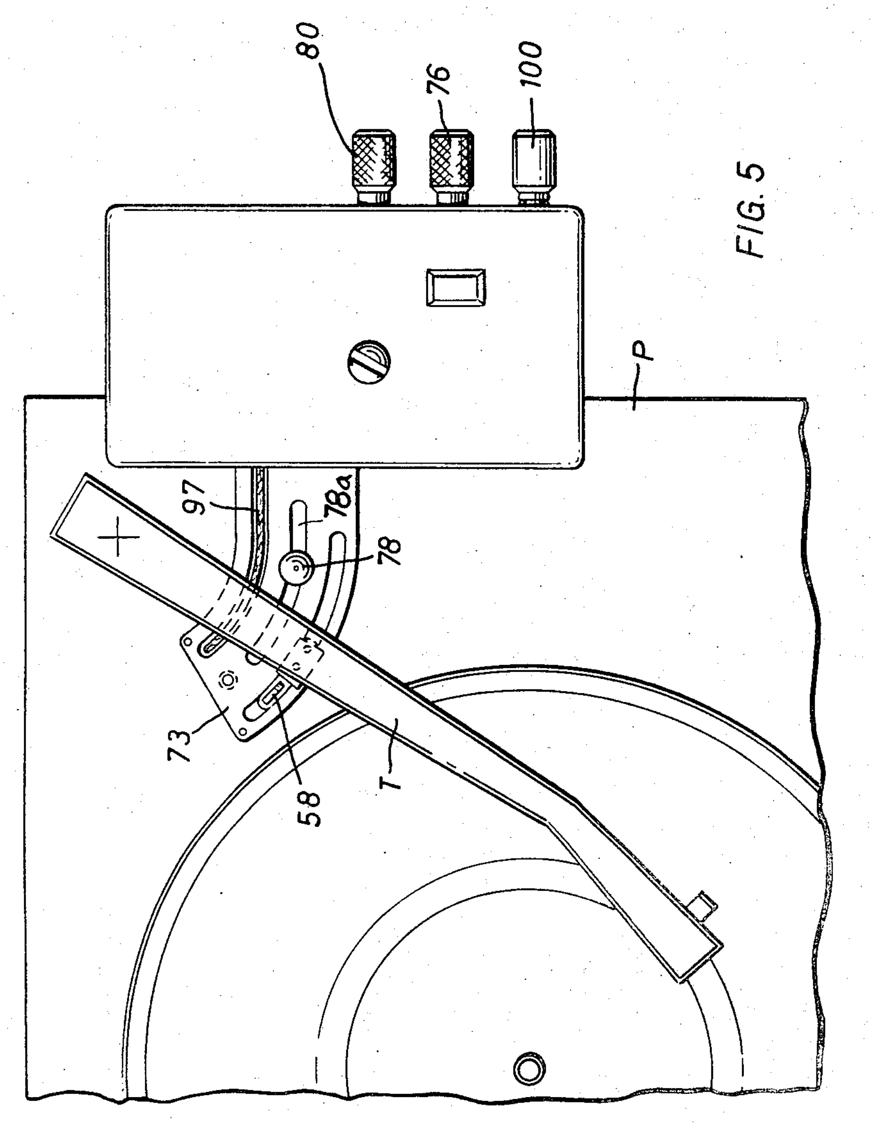
FIG. 5 is a fragmentary plan view of another embodiment of the invention.

In order to select a particular section of the record for repeated playing, the start position and end position of the tone arm can be set. An manually operable knob 61, see FIG. 3, is connected by shaft to a crank disc 61*a* in casing 8. A link 34 connects the crank pin with an adjusting lever 31 which carries magnetic switch 12, as best seen in FIG. 4. By turning knob 61, the position of magnetic switch 12 is adjusted across the record, and since the tone arm means are raised when magnet 30 reaches the region of magnetic switch 12, the position of magnetic switch 12 determines the end position of the tone arm, and consequently the point of the record groove where the playing is discontinued, and the tone arm moved back.

Another manually operated knob 46 is connected by a shaft to a crank disc 46*a*. A link 33 connects the crank pin of disc 46*a* with another adjusting member 32, which is partly covered by adjusting member 31 in the bottom view of FIG. 4. Adjusting member 32 has an abutment member 17 preventing manual turning of adjusting member 31 in counterclockwise direction as viewed in FIG. 4 beyond adjusting member 31 which controls the start position of the tone arm means and consequently must always be located outwardly of adjusting member 31. Adjusting member 32 carries a hook-shaped stop 19 which extends across slot 71, and consequently stops arm 23 together with carriage 2 when the same slide downward along the raised slanted guide arm 24 in the position R. In this manner, the start position of the tone arm is determined and the start position can be selected by turning adjusting member 32 by means of knob 46.

By operation of knobs 46 and 61, any section of the record can be selected for repeated playing. Shaft 53 of turn table 1 freely carries a worm gear 55 secured to a coupling part 54 and meshing with the worm 52 driven by a drive motor 11 provided with a centrifugal governor 11*a*. An adjusting member 1*a* shown in FIG. 3 controls the speed of motor 11 so that the rotary speed of the turn table can be set to be 33, 45, or 78 revolutions per minute, however, intermediate numbers of revolution can also be selected which is advantageous for records serving educational purposes.

A spring 14 urges gear 55 with coupling part 54 in axial direction of shaft 53, into engagement with another coupling part 35 which is secured to shaft 53 and drives the same and the turn table when coupling part 54, 35 are engaged by spring 14.

An electromagnetic means 6 has a movable armature to which a brake arm 62 is secured. The movable armature has a roller 65 located in an annular groove of coupling part 54, and when electromagnet 6 is energized upon actuation of a manually operated or remote controlled switch, coupling 54, 35 is disengaged, and simultaneously turn table 1 is braked by brake arm 62 so that the turn table and record stop. The armature of electromagnets 6 also opens a switch 64 connected into the circuit of the tone arm so that the current produced by the oscillations of the stylus is interrupted or short-circuited.

The apparatus may be modified by providing a tone arm turning about an axis in the usual manner instead of the rectilinear guidance of the tone arm in the embodiment illustrated in FIGS. 1 to 4. Stop means 32, 19, and sensing switch means 30, 31, are mounted for turning movement about an axis coinciding with the axis of the turnable tone arm. An impulse switch 84 is mounted on casing 8 for manually controlling repeated playing of a section independently of the automatic apparatus described above. A plug 82 can be used for remote control of the apparatus, as mentioned above, another plug 87 connects the conductors of the tone arm with an amplifier, not shown.

The apparatus is operated in the following maner: The point of the record where an interesting part of the recording starts is selected by turning knob 46 until adjusting member 32 assumes a position in which the hook-shaped stop 19 is engaged by arm 23 of carriage 2 in the outer position. Since tone arm 22 moves with carriage 2 the stylus is placed at the desired point.

The end of the section to be played is determined by turning knob 61 together with adjusting member 31 and magnetic switch. Indicia on knobs 46 and 61 permit an accurate determination of the start and stop positions of the tone arm accomplished by adjustment of the knobs. Motor 11 is started so that the engaged coupling 35, 54 rotates shaft 53 with turn table 1, and record S. Since the stylus is located in the record groove in the selected start position in which arm 23 abuts hook 19, turning of the record causes movement of the stylus in inward radial direction while carriage 2 moves along guide arm 24 which is in the lower position A.

When the end of the played section is reached by the stylus and tone arm 22, carriage 2 has moved to an inner position in which magnet 30 on arm 23 is located directly over magnetic switch 12 which was previously placed in the corresponding position by adjustment means 61, 31. Consequently, magnetic switch 30 is closed, and starts motor 4 which drives by reduction transmission 39, 44, 45 and crank pin 45*a*, arm 25 to turn guide arm 24 to a slanted raised position R causing carriage 2 to slide downward and outward together with tone arm 22 util arm 23 abuts hook-shaped stop 19. During this movement, magnet 30 moves away from the magnetic switch 12 so that the same disconnects motor 4. The weight of the raised guide arm 24 carriage 2, and tone arm 22, and mainly spring 57 cause arm 25 to turn about pivot pin 26*a* in a movement slowed down by the inertia of the rotary parts connected with gear 45 and by brake spring 28 acting on rotor 4. Consequently, the stylus of the tone arm is very gently placed on the record in the outer start position. Since the record continues to rotate, the spiral-shaped groove causes movement of the stylus and tone arm 22 from the start position to the end position where the desired section of the record terminates. In this end position, magnetic switch 12 is again operated by magnet 30 so that the return motions and playing motions of the tone arm are automatically repeated. When electromagnetic means 6 is energized by a switch, coupling 35, 54 is disengaged, and the turn table stops. During downward movement of the tone arm, arm 25 and slot 50 cause turning of gear 45 so that the rotor of the deenergized motor 4 is turned in a direction opposite to the direction in which it rotates in energized condition.

Figure 7:
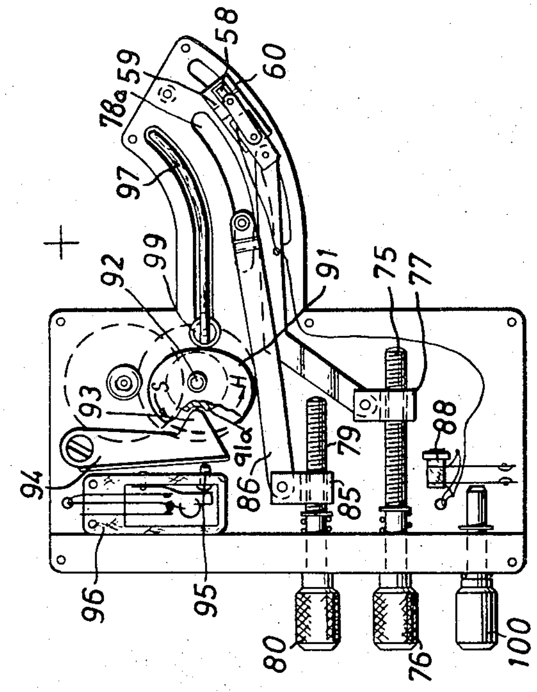
FIG. 7 is a bottom view of the adaptor of FIG. 6 with the bottom plate removed.
Figure 6:
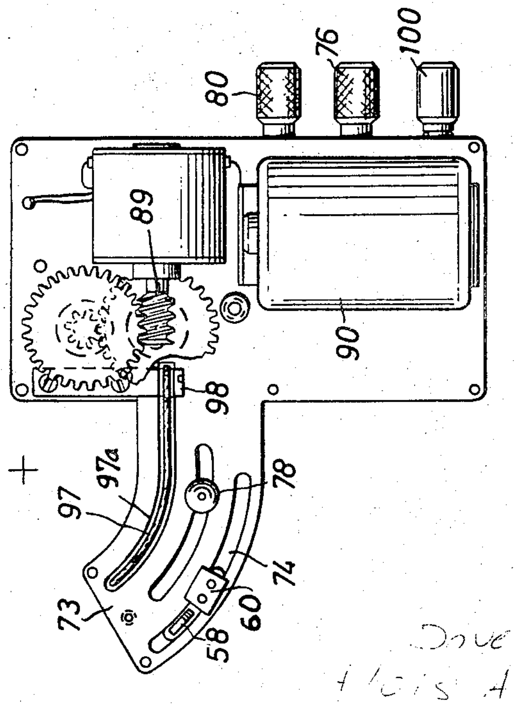
FIG. 6 is a fragmentary plan view illustrating an adaptor used in the embodiment of FIG. 5.
Figure 8:
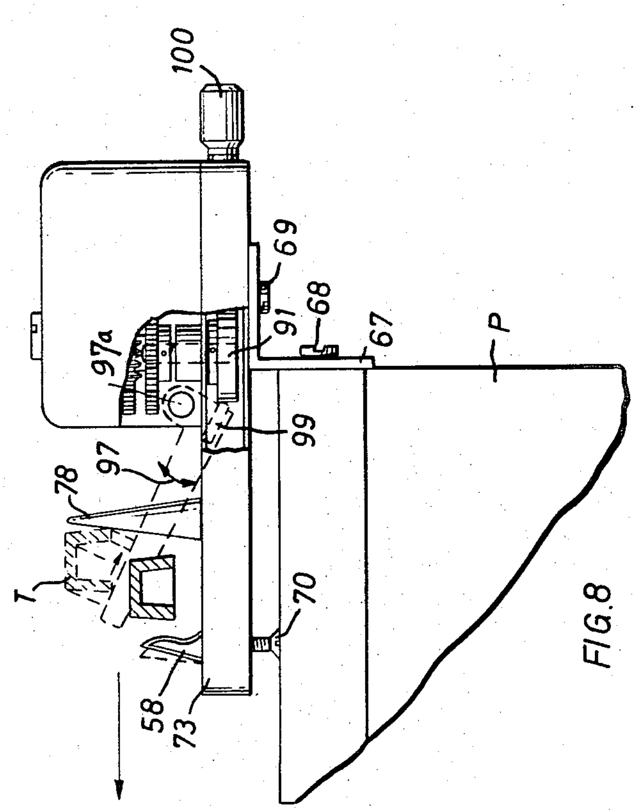
FIG. 8 is a side elevation of the embodiment of FIG. 5, partially in section.

The embodiment illustrated in FIGS. 5 to 8 is an adapter which can be attached to a standard record player for automatically playing only selected sections of a record. As shown in FIG. 8, a bracket 67 is secured by screws 68 to the casing P of the record player, and carries the adapter secured by screws 69. The adapter has a bottom plate with a curved projecting part 73 which extends over the top plate of casing P and is supported on the same by a screw 70 permitting adaptation of the device to different record players.

The projecting arm 63 has three arcuate slots of part-circular configuration. The tone arm T is mounted on casing P for turning movement about an axis and also movable between a raised position separated from the groove of the record and a play position engaging the groove in the usual maner. As best seen in FIG. 8, tone arm T is located between a sensing switch 58 which is mounted on a slide member 60 in slot 74, and a conical stop 78 which is mounted in slot 78*a* for movement along the same. Sensing switch 58 determines the inner end position of the tone arm, and stop 78 determines the outer start position of the same. A screw spindle 75 turned by a knob 76 meshes with a knot 77 connected by a link to slide 60 of sensing switch 58 so that by turning of knob 76 the position of sensing switch 58 in slot 73 can be adjusted whereby the inner end position of the tone arm is determined in a maner which will be explained hereinafter. A knob 80 is secured to a screw spindle 79 meshing with a knot 85 connected by a link 86 to stop 78 so that by turning of knob 76, the position of stop 78 in slot 78*a* and thereby the start position of the tone arm can be selected. A push button 100 is located adjacent knobs 76 and 80, and controls and actuates a switch 88 by which the repeat operation is started.

A guide arm 97 best seen in FIG. 8, has an angular portion mounted for turning movement of the stationary pivot 98 and a cam follower roller 99 cooperating with a cam 91 secured to a shaft 52. Due to the eccentric shape of the peripheral cam track of cam 91, the angular guide arm 97 is raised from its normal horizontal position to the downwardly slanted position shown in FIG. 8. Guide arm 97 is located under tone arm T so that upon raising of the guide arm, tone arm T is also raised to the position shown in broken lines in FIG. 8. Guide arm 97 is only partly shown in FIG. 8, which shows tone arm T in the start position abutting stop 78 after sliding down the raised and slanted guide arm 97. Guide arm 97 in the lower position is located within slot 97*a* in the curved arm 73, and therefore a portion of guide arm 97 located under the tone arm in the solid line position in FIG. 8, is not visible.

An electric motor 89 is mounted on the support plate of the adapter, and may be supplied with electric current from a battery 90, or from some other source. Motor 89 drives a worm gear reduction transmission 89*a* by which shaft 92 of cam 91 is driven. A second control cam 91*a* is also secured to shaft 92 and rotates in synchronism with cam 91. Cam 91*a* has a recess cooperating with a control lever 94 which is biased to slide along the peripheral surface of cam 91*a*, and to fall into the recess after each revolution of cam 91*a* and 91. Control lever 94 cooperates with the actuator 95 of a switch 96 connected into the circuit of motor 89 and holding the same energized as long as the projection 93 of lever 94 slides along the circular periphery of cam 91*a*.

In the initial position and after one revolution of cams 91*a*, 91, projection 93 falls into the recess of cam 91*a*, and switch 96 opens so that the motor is disconnected and stops.

When tone arm T engages sensing switch 58 after moving inwards across the record due to the action of the spiral record groove on the stylus, switch 58 which is connected to motor 89, starts the same. In order to maintain motor 89 energized after the impulse given by switch 58 has terminated, switch 96 is closed by lever

94 since cam 91*a* is turned by the started motor to a position in which projection 93 is no longer located in the recess so that the motor remains energized until cams 91*a*, 91 have completed one revolution.

During turning of cam 91 out of the position illustrated in FIG. 7, the higher cam portion H of cam 91 radially engages cam follower roller 99 so that guide arm 97 is raised. Since the tone arm is in the innermost end position it is located on the end of guide arm 97, and raised by the same out of the record groove. Tone arm T slides along the downwardly slanted guide arm 97 to a start position which is determined by the adjusted position of stop 78. Since cam 91 continues to rotate, guide arm 97 moves again downward since cam follower roller 99 moves onto a lower track portion of cam 91. Due to the shape of cam track portion S, the downward movement of guide arm 97, and of tone arm T resting on the same, is slow so that the stylus gently engaged the groove of the record in the start position. When projection 93 falls into the recess of cam 91*a* in the lowest positoin of guide arm 97, motor 89 is disconnected and cam 91 stops.

Switch 88 is connected to the motor, not shown, driving a turn table to start the operation by rotating the record which causes movement of the tone arm from the start position selected by adjusting stop 78 to the end position selected by adjusting switch 58.

Figure 9:
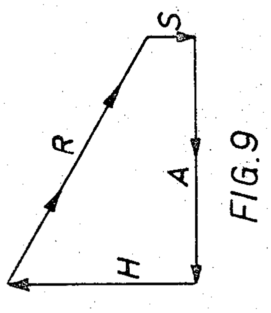
FIG. 9 is a vector diagram illustrating the movements of the tone arm and the stylus.

Due to the conical shape of stop 78, the tone arm sliding on guide arm 97 is stopped by a thin portion of stop 78, as shown in broken lines in FIG. 8. When guide arm 97 is lowered, tone arm T is guided along the conical surface to an exactly determined position which can be selected by adjusting the position of conical stop 78 by knob 80. The last part of the downward movement of the tone arm is consequently substantially vertical, as indicated by the vector S in FIG. 9, which also shows the horizontal vector A indicating the playing movement of the tone arm, H the vertical rising of the tone arm by the end of guide arm 97, and vector R indicating the downward sliding of the tone arm along guide arm 97. Since the movement in the direction of vector R is stopped by stop 78, the downward movement of the stylus into engagement with the record groove is slow and gentle.

The adapter illustrated in FIGS. 5 to 9 can be attached to any conventional record player and permits the automatic repeated playing of a selected section of a record, which is particularly advantageous for recorded language courses, or other instructive material which can be memorized by repetition.

When stop 78 and sensing switch 58 are set in such a manner that the starting position is at the beginning of the groove of the record, and the end position determined by switch 58 is at the inner end of the spiral groove, the entire record is automatically repeatedly played which may be desired for advertising purposes or for teaching of sleeping persons.

In a modification of the embodiment of FIGS. 5 to 9, a returning hook is pivotally connected with the cam 93, and when the tone arm is raised by guide arm 97, the hook engages the tone arm and pulls the same to the start position. This construction may be advisable if the raised position of the tone arm of a standard record player is not high enough to assure downward sliding along the guide arm 97 under the action of the force of gravity alone.

It will be understood that each of the elements described above, or two or more together, may also find a useful application in other types of apparatus for automatically playing records differing from the types described above.

While the invention has been illustrated and described as embodied in an apparatus for automatic repeated playing of a selected section of a record, it is not intended to be limited to the details shown since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be secured by Letters Patent is:

1. In a record player, in combination, a turntable for rotating a record; a support; guide means mounted on said support for pivotal movement about a horizontal axis between a horizontal position and a higher slanted position; tone arm means including a tone arm with a stylus, and a carriage supporting said tone arm for limited pivotal movement about another horizontal axis in a play position in which said stylus is adapted to engage the record, said carriage being mounted on said guide means for movement along the same in said horizontal position with said tone arm in said play position so that due to action of the record, said tone arm means move between a start position and an end position along a path; stop means in said path for engaging said tone arm means in said start position; switch means in said path actuated by said tone arm means in said end position, and opened by said tone arm means in said start position; drive means including a motor started by said actuated switch means, and transmission means connecting said motor with said guide means for turning the latter between said horizontal position and said higher slanted position downwardly slanting from said end position to said start position so that said tone arm is raised in said end position to a raised position whereby said carriage with said tone arm move downwardly along the slanted guide means under the action of gravity from said raised end position to said start position whereby said switch means is opened and said motor stops; and biasing means for moving said guide means to said horizontal position when said motor stops and said tone arm means is in said start position whereby the latter moves to said play position so that said tone arm means is moved by the record to said end position for actuating said switch means, and automatically repeates movements between said start and end positions.

2. An apparatus as set forth in claim 1 wherein said guide means is straight so that said carriage, said tone arm, and said stylus move along a straight path, the path of said stylus being located along a radius of the record; including a first pivot means on said support for mounting said guide means for pivotal movement about said horizontal axis; and a second pivot on said carriage for supporting said tone arm for pivotal movement about a second horizontal axis perpendicular to said first horizontal axis.

3. An apparatus as set forth in claim 1, including an arm projecting from said guide means, pivot means suporting said arm and said guide means for turning movement about said horizontal axis; crank means connected with said arm; a spring connected to said arm; said motor having a rotor driving said crank means so that said guide means is biased by said spring to turn to said horizontal position while turning said rotor whereby the downward movement of said tonearm means to said play position is braked by the mass of said rotor.

4. An apparatus as set forth in claim 3 including a stop arm secured to said carriage, a magnet mounted on said arm; and wherein said switch means includes a magnetic switch actuated by said magnet when said tonearm means is in said end position.

5. An apparatus as set forth in claim 4 wherein said stop means is a hook for engaging said stop arm; a lever supporting said hook; manually turnable means; and a linkage connecting said manually turnable means with said lever for adjusting the position of said hook and thereby said start position, another lever supporting said magnetic switch; and manually operated means for turning said lever whereby the position of said switch and thereby said end position is adjusted.

6. In a record player, in combination, a turntable for rotating a record; tonearm means movable between a raised position and a play position, and movable in said play position by the record along a path; stop means on said path for engaging said tonearm means in a start position; switch means on said path actuated by said tonearm means in an end position spaced from said stop means and released by said tonearm means in said start position; drive means including a drive motor actuated by said actuated switch means, a cam driven by said motor; a guide means having a cam follower cooperating with said cam and moved by the same between a horizontal position and a downward slanted position extending between said end and start positions, said guide means raising said tonearm means in said end position to said raised position so that the same slides downwardly along said guide means under the action of gravity from the raised end position to said start position and into engagement with said stop means whereupon said cam permits downward movement of said guide means with said tonearm means to said play position in which said tonearm means is moved by the record to said end position and into engagement with said switch means, and automatically repeats movements between said start and end positions; a support plate having a projection formed with three part-circular slots; said switch means being mounted in one of said slots for movement along the same, said stop means being mounted in another of said slots for movement along the same, and said guide means being a guide arm pivotally mounted on said projection located in the third slot in said horizontal position; and manually operated means for moving said switch means and said stop means along said slots for adjusting said start and end positions.

7. An apparatus as set forth in claim 6 wherein said stop means includes a conical stop for guiding said tonearm means in said start position to said play position.

8. An apparatus as set forth in claim 6 including another switch connected with said motor, and a movable pawl controlling said other switch, another cam secured to said cam and controlling said pawl to operate said other switch when said switch means is released by said tonearm means, so that said motor and said cams continue rotation after release of said switch means by said tonearm means.

9. An apparatus as set forth in claim 8 wherein said other cam is circular and has a peripheral recess engaged by said pawl after each revolution of said cams for opening said other switch.

References Cited

UNITED STATES PATENTS

| | | | |
|---|---|---|---|
| 2,602,668 | 7/1952 | Finneran et al. | 274—15 |
| 1,291,985 | 1/1919 | Manson | 274—14 |

LEONARD FORMAN, *Primary Examiner.*

FELIX J. D'AMBROSIO, *Assistant Examiner.*